United States Patent [19]
Boe et al.

[11] Patent Number: 5,630,906
[45] Date of Patent: May 20, 1997

[54] PROCESS FOR THE DELIGNIFCATION AND BLEACHING OF A LIGNOCELLULOSE MATERIAL

[75] Inventors: Jean-François Boe, Toulouse; Jean-Jacques Girerd, Gif Sur Yvette; Claude Guignard, Ossage; Jean-Louis Seris, Jurancon; Jean-Baptiste Verlhac, Talence, all of France

[73] Assignee: Elf Aquitaine Production, Coubevoie, France

[21] Appl. No.: 356,283
[22] PCT Filed: Jun. 21, 1993
[86] PCT No.: PCT/FR93/00613
   § 371 Date: Feb. 23, 1995
   § 102(e) Date: Feb. 23, 1995
[87] PCT Pub. No.: WO94/00234
   PCT Pub. Date: Jan. 6, 1994

[30] Foreign Application Priority Data
Jun. 22, 1992 [FR] France .................... 92 07577

[51] Int. Cl.$^6$ .................................................... D21C 9/14
[52] U.S. Cl. .................................................... 162/74; 162/78
[58] Field of Search .................................. 162/72, 76, 78, 162/80, 84, 74

[56] References Cited

U.S. PATENT DOCUMENTS 5,143,580  9/1992  Basta et al. ............................ 162/40
5,244,594  9/1993  Favre et al. ......................... 252/186.33

Primary Examiner—Frank Spear
Attorney, Agent, or Firm—Burgess, Ryan & Wayne

[57] ABSTRACT

A method is provided for delignifying and bleaching a lignocellulose material, wherein an aqueous solution of a redox catalyst and an oxidant is reacted with the material. The catalyst comprises an organometallic cation of the general formula $[(1)Mno_2Mn(L)]^{n+}$, wherein Mn is manganese (III) or (IV) oxide, the two Mn's of this cation may form a pair in a III-III, III-IV or IV-IV oxidative state, n is 2, 3 or 4, O is oxygen, and L is a ligand comprising 4 nitrogen atoms co-ordinating the manganese.

13 Claims, No Drawings

PROCESS FOR THE DELIGNIFCATION AND BLEACHING OF A LIGNOCELLULOSE MATERIAL

BACKGROUND OF THE INVENTION

1. Field of the Invention

The present invention relates to a process for the delignification and bleaching of a lignocellulose material by an aqueous solution of an oxidizing agent and of an oxidation-reduction catalyst.

The invention therefore relates to the technical field of wood and of paper pulp and also to that of natural or synthetic oxidation-reduction catalysts.

2. Background Art

Many studies relate to processes for the degradation of wood lignin or paper pulp.

As restated by A. Paszcynski et al., Applied and Environmental Microbiology, 1988, 62–68, many of these studies are based on the study of natural wood degradation phenomena.

Thus a specific strain of basidiomycetes, known under the name of "Phanerochaete chryosporium" and leading to white rot of wood, was particularly studied as regards the biochemical mechanisms which are involved in delignification.

Two types of extracellular enzymes containing porphyrin groups are involved in the degradation of wood.

These enzymes have in common the ability to decompose peroxides, which ability is characteristic of peroxidases; their catalytic cycle comprises the oxidation of the iron porphyrin by the peroxide and then the return to the initial state by virtue of electrons withdrawn from the molecules present in the medium.

Ligninases capture an electron from the aromatic rings of lignin and thus form radical cation species which progress non-enzymatically and which lead to depolymerization of lignin.

Manganese peroxidases oxidize $Mn^{2+}$ cations to $Mn^{3+}$ cations. The $Mn^{3+}$ cations diffuse into the structures of wood and capture an electron to restore $Mn^{2+}$.

The above writers treated wood shavings or paper pulp with a number of natural or synthetic iron porphyrins in the presence of an oxidizing agent chosen from hydrogen peroxide or tert-butyl hydroperoxide (TBH), in an aqueous medium.

The experiments were carried out with a wood/water ratio by mass of 0.2% and a pulp/water ratio by mass of 0.1% at approximately 100° C. (reflux temperature of water) for 24 to 48 h.

The chosen kraft pulp, treated with an iron hemin/TBH, sees its kappa number decrease from 36 to 2 with removal of 100% of the lignin and only 10% of the cellulose.

On the other hand, wood shavings treated under identical temperature and time conditions with hydrogen peroxide alone or with the $H_2O_2$/hemin combination lead to the same results, namely a degradation of the lignin and cellulose which is non-selective and of the same order of magnitude. Heroin does not seem to play any specific role in the presence of $H_2O_2$.

On the other hand, in the presence of TBH, by refluxing for 48 h, 38% of the lignin is removed with concomitant removal of 9.5% of the cellulose.

In concluding their studies, these writers recognize that their process cannot be applied industrially.

For their part, P. S. Skerker et al., Biotechnology in Pulp and Paper Manufacture, Chap. 18, 203–210, Butterworth, Heinemann (1990), have studied the biomimetic bleaching of kraft pulps using synthetic porphyrins in the presence of TBH. The porphyrin which is soluble in water and which is resistant to oxidation is mesotetra -(2,6-dichloro-3-sulphonatophenyl)-β-octachloroporphinatoiron(III).

It should be noted that this porphyrin comprises 16 chlorine atoms substituting the phenyl and pyrrole rings and 4 sulphonato groups and that its synthesis is very expensive. Replacement of iron by manganese in this porphyrin structure does not substantially change the results.

Having a pulp with a consistency of 2.5%, a delignification of better than 45% is obtained in 15 min at 80° C. in water with the above Fe(III) porphyrin, the kappa number decreasing from 23.5 to 18.7. However, these conditions lead to a decrease in the viscosity of the pulp by a factor of approximately 2, which is a sign of severe depolymerization of the cellulose.

In their conclusion, these writers themselves recognize that their process cannot be operated industrially.

Forrester et al., Biochemical and Biophysical Research Communications, Vol. 157, no. 3, 992–999, 1988, were concerned with the second type of enyzmes which are involved in the delignification caused by Phanerochaete chrysosporium. These writers have shown that a simpler biomimetic system, consisting of the $Mn^{3+}$ cation complexed with pyrophosphate and in the presence of reduced glutathione, oxidized veratryl alcohol to the corresponding aldehyde and also caused delignification of wood fibres.

With veratryl alcohol, if hydrogen peroxide is added to the above reaction medium, approximately 3 times less veratraldehyde is obtained.

Apart from the technical field of wood and paper pulp; other natural metal complexes involved in biological oxidations have formed the subject of publications.

Saver, Acc. Chem. Res., 13, 249 (1980) and the references cited, restates that complexes containing two manganese atoms can be involved in biological oxidations.

Hodgson et al., Inorganica Chemical Acta, 141 (1988), 167–168, reviews synthetic complexes containing two manganese atoms and describes, in particular, some in which the metal is in high oxidation states.

The 2,2'-bipyridine (bpy) complex of formula $[(bpy)_2MnO]_2^{3+}$ and its 1,10-phenanthroline (phen) analogue are known. These complexes have been isolated in the form of stable solids in the Mn(III)/Mn(IV) oxidation state and have been studied in solution in their Mn(IV)/Mn(IV) complete oxidation state.

The phen complex has been isolated as a solid in the Mn(IV)/Mn(IV) state and its structure characterized by M. Stebler et al., Inorg. Chem., 25, 4743 (1986).

D. J. Hodgson et al., in the above publication, report the synthesis of a new complex (I):

$$[TPA)Mn(III)O_2Mn(IV)(TPA)]^{3+} \quad (I)$$

in which TPA is a tetradentate ligand consisting of tris (pyridyl-2-methyl)amine.

The complex (I) is obtained by mixing TPA and $MnSO_4 \cdot H_2O$ in water and then adding hydrogen peroxide. By addition of sodium dithionate, the salt $[(TpA)MnO]_2 \cdot (S_2O_6)_{3/2} \cdot 7H_2O$ crystallizes and its structure is determined by X-ray crystallography.

Uehara et al., Chemistry Letters, 1988, 477–480, have isolated the complexes:

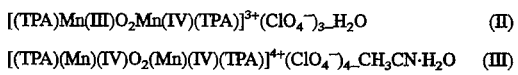  (II)

[(TPA)(Mn)(IV)O$_2$(Mn)(IV)(TPA)]$^{4+}$(ClO$_4^-$)$_4$·CH$_3$CN·H$_2$O  (III)

(II) being obtained by oxidation with hydrogen peroxide and (III) by electrochemical oxidation of (II) in acetonitrile.

Hodgson et al., J. Am. Chem. Soc., 1990, 112, 6248–6254, restate that the possible use of bis(μ-oxo) dimanganese complexes as redox catalysts follows from the preliminary observations of Gref et al., Nouv. J. Chem., 1984, 8, 615–618, who electrochemically oxidized alcohols and ethers in the presence of bpy and phen complexes of manganese (see above), and from the studies by Ramaraj et al., Angew. Chem. Int. Ed. Engl., 1986, 25, 825–827, who showed that the bpy complex oxidized water in the presence of a chemical oxidizing agent such as the cerium(IV) ion.

In the above publication, D. J. Hodgson et al. restate or describe the preparation of complexes of the type of general formula (IV):

[(L)MnO$_2$Mn(L)]$^{2+ \text{ or } 3+}$  (IV)

accessible from Mn(II) by oxidation with hydrogen peroxide in the presence of the ligand (n) of general formula (V) or (VI):

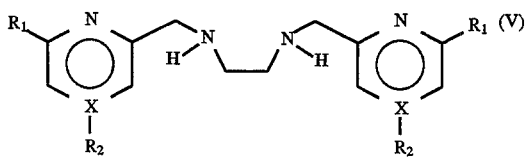

in which:
R$_1$=R$_2$=H; X=C; (Bispicen) or
R$_1$=CH$_3$; R$_2$=H; X=C; or
R$_1$=H; R$_2$=CH$_3$; X=C;
R$_1$=H; X=N;
or else:

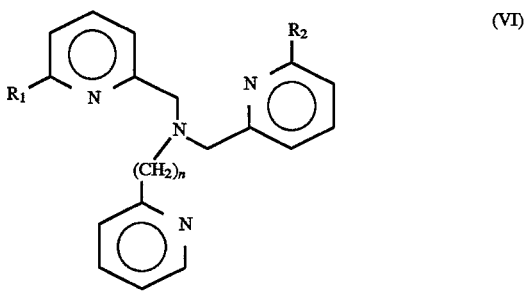

in which:
R$_1$=R$_2$=H; n=1 [TPA]; or
R$_1$=CH$_3$; R$_2$=H; n=2; or
R$_1$=R$_2$=CH$_3$; n=1.

The electrochemical properties of these complexes were studied by cyclic voltametry in acetonitrile.

Hodgson et al., Inorg. Chem., 1990, 29, 2435–2441, have synthesized new ligands related to those above:
-(2-(2-pyridyl)ethyl)bis(2-pyridylmethyl)amine (L$_1$),
-(1-(2-pyridyl)ethyl)(2-(2-pyridyl)ethyl)(2-pyridylmethyl) amine (L$_2$),
-(6-methyl-2-pyridylmethyl)(2-(2-pyridyl)ethyl)(2-pyridylmethyl)amine (L$_3$),
-(6-methyl-2-pyridylmethyl)bis(2-pyridylmethyl)amine (L$_4$).

These ligands L$_1$, L$_2$, L$_3$ and L$_4$ lead to di-Mn complexes of the type restated above and catalyse the epoxidation of cyclohexene in the presence of iodosobenzene, which acts as the primary oxidizing agent.

The complex (L$_3$) Mn(III)O$_2$Mn(IV)(L$_3$) (ClO$_4$)$_3$ was prepared by oxidation using hydrogen peroxide and then oxidized with NaOCl in acid medium to give the complex:

(L$_3$)Mn(IV)O$_2$Mn(IV)(L$_3$)(ClO$_4$)$_4$

Patent Application EP 0,458,398 (Unilever NV and plc) relates to a bleaching medium comprising a peroxy bleaching agent and a manganese coordination complex (or a precursor of the latter) for use in washing and bleaching substrates, especially for textile whitening or washing dishes.

The latter coordination complex has the general formula (A):

[L$_n$Mn$_m$X$_p$]$^z$ Y$_q$  (A)

in which:
Mn is manganese in the IV oxidation state,
n and m independently have the value of integers from 2 to 8,
X can represent a coordinating or bridging group such as H$_2$O, OH$^-$, O$_2^{2-}$, HO$_2^-$, SH$^-$, S$^{2-}$, -SO-, NR$_2^-$, RCOO$^-$, NR$_3$, Cl$^-$, N$_3^-$, SCN$^-$ or N$^{3-}$, or a combination thereof, with R representing H, alkyl or aryl (optionally substituted),
is a integer from 0 to 32, preferably 3 to 6,
Y is a counterion whose type depends on the charge z of the complex; if z is positive, then Y represents an anion such as Cl$^-$, Br$^-$, I$^-$, NO$_3^-$, ClO$_4^-$, NCS$^-$, PF$_6^-$, RSO$_3^-$, RSO$_4^-$, CF$_3$SO$_3^-$, BPh$_4^-$0 or OAc$^-$; if z is negative, then Y is a cation of an alkali metal or alkaline-earth metal or alternatively an (alkyl)ammonium cation,
z is a negative or positive integer,
q=z/charge of Y,
L is a ligand which is an organic molecule containing a certain number of heteroatoms (N, P, O and S), some of which are coordinated to the manganese atoms.

Those which are preferred, from this family of complexes of formula (A), are of general formula (C):

[(L)Mn(IV)(μ-O)$_3$Mn(IV)(L)]$^z$ Y$_q$  (C)

in which L, Y, q and z are identical to those of the formula (A).

A preferred class of ligands L which correspond to the formula (C) are tridentate ligands which coordinate each manganese(IV) centre with 3 nitrogen N atoms.

Bis(pyrid-2-ylmethyl)amine appears among 19 of the latter (containing 3 nitrogen atoms).

The peroxy bleaching agents used comprise hydrogen peroxide (H$_2$O$_2$), compounds which release or generate H$_2$O$_2$, especially sodium perborate, and peroxy acids and their salts.

All the examples of this patent application (EP 0,458,398) relate to the bleaching, using these complexes, of stained cotton textile, at basic pH values between 10 and 11.

The problem of selectively delignifying lignocellulose materials without excessively depolymerizing the cellulose and without having industrial effluents which are environmentally undesirable remains current.

As restated by H. U. Süss, Bleaching, Vol. A4, 191–199, 1985, the bleaching of pulp in the paper industry by oxidizing agents exhibits disadvantages inherent in the properties of the oxidizing agent used or in the physicochemical conditions of the process employed.

Oxygen, for example, has little selectivity and also severely degrades the cellulose in NaOH medium and, to a lesser degree, in the presence of magnesium salts.

Chlorine is a relatively selective delignifying agent. Under the acidic conditions used, it causes oxidation but also electrophilic substitution of the aromatic rings of the lignin, producing dicarboxylic acids and chlorinated fragments of the lignin. The latter represent a potential danger to the environment.

Hydrogen peroxide is used essentially in basic medium. This basic medium leads to a certain depolymerization of the cellulose.

SUMMARY OF THE INVENTION

The aim of the present invention is the development of a new means for delignifying and bleaching lignocellulose material in suspension in an aqueous medium.

Another, more specific, aim is to avoid the nucleophilicity of chlorine in bleaching paper pulp in order to eliminate potential environmental problems related to TOX ("total organically bound halogens").

A third aim is to use oxygen-containing oxidizing agents such as ozone, hydrogen peroxide or their mixtures in a delignification and a bleaching in acidic or neutral aqueous medium, by adjusting the oxidation potential of this medium to a chosen value.

The present invention is a process for the delignification and bleaching of a lignocellulose material in suspension in an aqueous medium containing an oxidizing agent and an oxidation-reduction catalyst chosen from a family of ligand-containing manganese complexes, some of which have already been described, especially by D. J. Hodgson et al.

More precisely, the present invention is a process for the delignification and bleaching of a lignocellulose material in which an aqueous solution of a redox catalyst and of an oxidizing agent is reacted with the said material, characterized in that the said catalyst contains an organometallic cation of general formula (VII):

in which:

Mn represents manganese in a III or IV oxidation state, it being possible for the two Mn atoms of this cation to form an pair in the III-III or III-IV or IV-IV oxidation state, n has the value 2, 3 or 4, O representing oxygen, L represents a ligand of general formula (VIII):

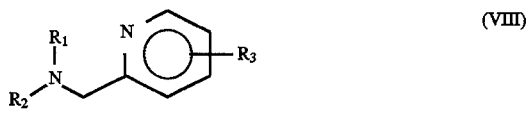

in which either $R_1$ represents the radical:

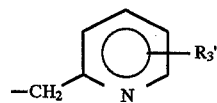

$R_2$ then representing the radical:

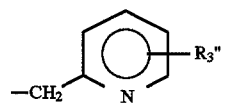

$R_3$, $R'_3$ and $R''_3$ each representing, independently of one another, a group chosen from hydrogen, $C_1$ to $C_4$ lower alkyl, $C_1$ to $C_4$ lower alkoxy or halogen, or $R_1$ represents the radical:

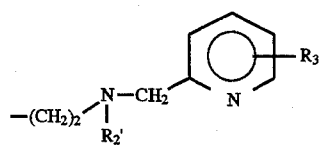

$R_2$ and $R'_2$ then being identical and representing a group chosen from hydrogen or $C_1$ to $C_4$ lower alkyl, $R_3$ representing a group chosen from hydrogen, $C_1$ to $C_4$ lower alkyl, $C_1$ to $C_4$ lower alkoxy or halogen.

In the above formula (VII), the counteranion is not represented but it can have, for example, the same meaning as that of Y of the above formulae (A) or (C).

DESCRIPTION OF THE PREFERRED EMBODIMENTS

This process has the advantage that the organometallic cation (VII) is very stable with respect to the oxidizing power of the medium and that the solution containing it can, after reaction, be recovered and reacted again with a new batch of lignocellulose material to which the oxidizing agent has been added.

The pH of the aqueous solution is advantageously less than 7 and preferably between 2 and 5.

Advantageously, in order to remove, by extraction, the oxidation products of the lignocellulose material, the latter, after the oxidation reaction ((VII)+oxidizing agent), is treated with a basic aqueous solution.

This basic treatment can be preceded by a washing with water and/or a pressing of the lignocellulose material.

The oxidizing agent is preferably chosen from ozone, hydrogen peroxide, an alkyl hydroperoxide, hypochlorous acid, chlorine, chlorine dioxide or their mixtures. The criterion in selecting these oxidizing agents consists in determining their ability to give the cation of general formula (VII), the two manganese atoms of which are in the III-III or III-IV or IV-IV oxidation states.

The III-III state is not always isolated for all the complexes. For example, in the case where L is TPA, the oxidation state obtained in the synthesis of this complex where hydrogen peroxide is involved is III-IV. Likewise, when L is (6-methyl-2-pyridylmethyl)(2-(2-pyridyl)ethyl)(2-pyridylmethyl)amine ($L_3$), the cation (VII) obtained by the action of hydrogen peroxide is III-IV. Chemical oxidation of this complex with NaOCl placed in acidic medium gives the IV-IV oxidation state.

On the other hand, in the case where L is bis(6-methyl-2-pyridylmethyl)(2-pyridylmethyl)amine, the oxidation state obtained with hydrogen peroxide is III-III.

The preferred combinations of the redox cations of general formula (VII) with the oxidizing agents are those which lead to an III-IV and/or IV/IV oxidation state.

The oxidizing agent is preferably added little by little to the solution of the redox catalyst (VII) in the presence of the pulp, so that there is no excess of oxidizing agent which can react directly with the lignocellulose material.

The oxidation potential is then, as it were, buffered to that of the redox catalyst (VII) in its III-IV state or, according to the situation, its IV-IV state, it being known that the oxidation potential of the oxidizing agent is, in principle, always greater than that of the redox catalyst.

The lignocellulose material reacted is advantageously wood fragments or paper pulp containing lignin.

Preferably, each group $R_3$, $R'_3$ and $R''_3$ is in the para position with respect to the doublet of the pyridine nitrogen.

Advantageously, each group $R_3$, $R'_3$ and $R''_3$ is chosen from lower alkyl or lower alkoxy.

Advantageously, the ratio by weight of the redox catalyst to the lignocellulose material is between 0.1 and 10%. Preferably, in order to have sufficiently fast oxidation kinetics, the temperature of the said aqueous solution of oxidizing agent and of catalyst is between 80° C. and 100° C. Finally, the catalyst/oxidizing agent molar ratio is preferably between 0.1 and 4%.

Advantageously, the ratio by weight of the lignocellulose material to the oxidizing agent is between 2 and 100.

The ligands of general formula (VIII) are generally synthesized from the pyridine compounds of the general formula (IX):

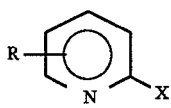
(IX)

in which:

R represents a group chosen from H, lower alkyl, lower alkoxy or halogen,

R is in the 3-, 4-, 5- or 6-position on the pyridine ring and preferably in the 4-position, X represents a group chosen from -CH$_3$, -CH$_2$OH, -CH$_2$Cl, -CHO, -CH=N-OH, -COCH$_3$, -CO$_2$H, -CO$_2$R' with R' representing a lower alkyl, -CN or -CH$_2$NH$_2$.

The various groups X above can be obtained by known reactions, from one to another, by functionalizations, reductions or oxidations.

Some compounds (IX) are commercially available and appear, for example, in the Aldrich catalogue 1991–1992.

These products are indicated in the following Table 1:

TABLE 1

| R | X |
|---|---|
| H | —CH$_3$ |
| H | —CH$_2$OH |
| H | —CH$_2$Cl |
| H | —CHO |
| H | —CH=NOH |
| H | —COCH$_3$ |
| H | —CO$_2$H |
| H | —CN |
| H | —CH$_2$NH$_2$ |
| 3-CH$_3$ | —CH$_3$ |
| 4-CH$_3$ | —CH$_3$ |
| 5-CH$_3$ | —CH$_3$ |
| 6-CH$_3$ | —CH$_3$ |
| 6-CH$_3$ | —CHO |
| 6-Cl | —CH$_3$ |

Other compounds (IX) are known from the literature and are collated in the following Table 2:

TABLE 2

| R | X | Reference No. |
|---|---|---|
| 3-CH$_3$— | —CH$_2$OH | 1 |
| 4-CH$_3$— | —CH$_2$OH | 1 |
| 5-CH$_3$— | —CH$_2$OH | 1 |
| 6-CH$_3$— | —CH$_2$OH | 2 |
| 3-CH$_3$— | —CH$_2$Cl | 3, 4, 6 |
| 4-CH$_3$— | —CH$_2$Cl | 3 |
| 5-CH$_3$— | —CH$_2$Cl | 3, 4 |

TABLE 2-continued

| R | X | Reference No. |
|---|---|---|
| 6-CH$_3$— | —CH$_2$Cl | 2, 3, 5, 6 |
| 5-CH$_3$CH$_2$— | —CH$_2$Cl | 3 |
| H— | —CH(Cl)CH$_3$ | 6 |
| 3-CH$_3$— | —CHO | 1, 7, 14 |
| 4-CH$_3$— | —CHO | 1, 8 |
| 5-CH$_3$— | —CHO | 1, 7 |
| 6-CH$_3$— | —CHO | 1, 7 |
| 5-CH$_3$— | —COCH$_3$ | 9 |
| 4-CH$_3$— | —CN | 8 |
| 5-CH$_3$— | —CN | 9 |
| 6-CH$_3$— | —CH=N—OH | 10 |
| 6-CH$_3$— | —CH$_2$NH$_2$ | 10 |
| 3-CH$_3$— | —CH$_2$CN | 3 |
| 4-CH$_3$— | —CH$_2$CN | 3 |
| 5-CH$_3$— | —CH$_2$CN | 3 |
| 5-CH$_3$CH$_2$— | —CH$_2$CN | 3 |
| 6-CH$_3$— | —CH$_2$CN | 3 |
| 3-CH$_3$O— | —CH$_2$OH | 11 |
| 4-CH$_3$O— | —CH$_2$OH | 1, 12 |
| 6-CH$_3$O— | —CH$_2$OH | 1 |
| 3-CH$_3$O— | —CHO | 11, 13 |
| 4-CH$_3$O— | —CHO | 1, 12 |
| 6-CH$_3$O— | —CHO | 1 |
| 4-Cl— | —CH$_2$OH | 1, 4 |
| 5-Cl— | —CH$_2$OH | 15 |
| 6-Cl— | —CH$_2$OH | 4, 12, 16 |
| 4-Br— | —CH$_2$OH | 12 |
| 5-Br— | —CH$_2$OH | 15 |
| 6-Br— | —CH$_2$OH | 12 |
| 3-F— | —CH$_2$OH | 15 |
| 5-F— | —CH$_2$OH | 15 |
| 4-Cl— | —CH$_2$Cl | 16 |
| 6-Cl— | —CH$_2$Cl | 4, 16 |
| 4-Cl— | —CHO | 1 |
| 5-Cl— | —CHO | 15 |
| 6-Cl— | —CHO | 12 |
| 4-Br— | —CHO | 12 |
| 5-Br— | —CHO | 15 |
| 6-Br | —CHO | 12 |
| 3-F— | —CHO | 15 |
| 5-F— | —CHO | 15 |
| 5-Cl— | —CH$_2$NH$_2$ | 17 |
| 6-Cl— | —CO$_2$H | 12 |
| 6-Br— | —CO$_2$H | 12 |

References

1. O. E. Schulz et al., Arch. pharm. (Weinheim), 310, 128–136 (1977).
2. M. H. Newcomb et al., J. Am. Chem. Soc., 99:19, 6392–6398, (1977).
3. R. Cabill et al., Org. Magn. Resonance, 4, 259–281, (1972).
4. F. Haviv et al., J. Med. Chem., 26, 218–222, (1983).
5. I. Matsumono et al., Chem. Pharm. Bull., 15, 1990-, (1967).
6. G. E. Jeromin et al., Chem. Ber., 120, 649–651, (1987).
7. T. Nagano et al., Free Rad. Res. Comm., 12–13, 221–227, (1991).
8. D. J. Hodgson et al., J. Am. Chem. Soc., 112, 6248–6254, (1990).
9. T. A. Crabb et al., Org. Magn. Resonance, 20, 4, 242–248, (1982).
10. O. Fuentes et al., J. Org. Chem., 40, 9, 1210–1213, (1975).
11. F. A. French et al., J. Med. Chem., 17, 2, 172–181, (1974).
12. A. Ashimori et al., Chem. Pharm. Bull., 38(9), 2446–2458, (1990).
13. D. L. Comins et al., J. Org. Chem., 55, 69–73, (1990).
14. D. L. Comins et al., Tetrah. Letters, 29, 7, 773–776, (1988).

15. E. J. Blanz et al., J. Med. Chem., 13, 6, 1124–1130, (1970).
16. J. H. Barnes et al., Tetrahedron, 38, 22, 3277–3280, (1982).
17. M. T. Edgar et al., J. Org. Chem., 44, 3, 390–400, (1979).

The synthesis of the compounds (IX) with $X=-CH_2NH_2$ can be carried out from the corresponding aldehyde by forming the aldoxime by reaction with hydroxylamine and then reducing this oxime by catalytic reduction, according to the above Reference 10, or with lithium aluminium hydride in an appropriate solvent, for example ether, according to the following scheme (1):

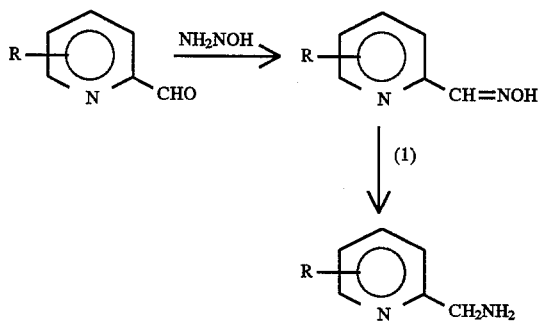

The ligands of general formula (VIII) are synthesized by analogy with the processes used by A. R. Oki, J. Glerup and D. J. Hodgson, Inorg. Chem., 29, 2435–2441, (1990):

1) Synthesis of ligands (VIII A) of the TPA type according to the following scheme (3):

2) Synthesis of ligands (VIII B) of the substituted Bispicen type according to the following scheme (4):

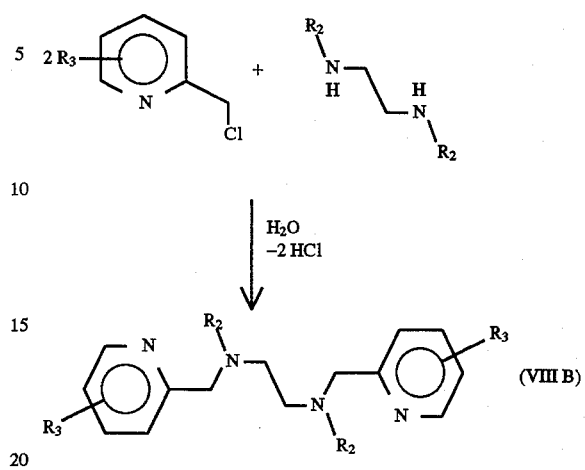

The catalysts (VII) in which n has the value 2 or 3 are obtained by mixing a salt containing the $Mn^{2+}$ cation, especially contributed by $MnSO_4$ or $MnCl_2$, with a ligand L (VIII) in water in the presence of hydrogen peroxide, according to the processes described by D. J. Hodgson (see above).

The complexes (VII) in which n has the value 4 are obtained by oxidizing the corresponding complexes in which n has the value 2 or 3 with more powerful oxidizing agents than hydrogen peroxide, for example hypochlorous acid (HClO), chlorine dioxide ($ClO_2$), chlorine or ozone.

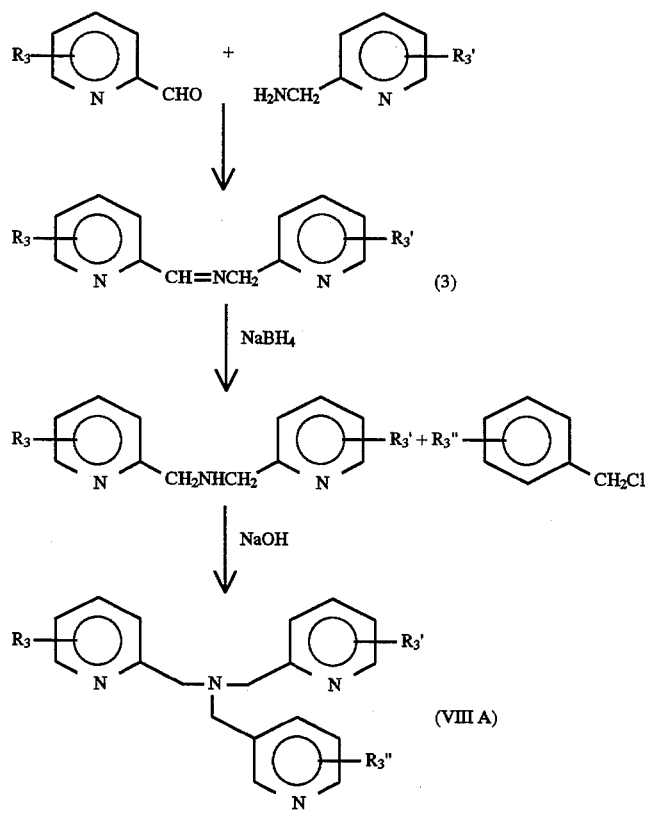

The present invention will be better understood with the aid of the following examples which are given purely by way of illustration. The delignification and bleaching tests are carried out on homogeneous batches of unbleached hardwood pulp (A) or of unbleached softwood pulp (B).

The qualities of the paper pulp: kappa number (K) of the pulp and degree of polymerization of the cellulose (DP), are determined as specified below.

The determination of the kappa number, an objective measurement of the lignin contained in the pulp, is carried out as follows:

the lignin is oxidized with $KMnO_4$ in weakly acidic medium. The kappa number is defined (according to Standard NF/150-302) as the number of millilitres of a 0.02M $KMnO_4$ solution necessary to oxidize completely one gram (dry weight) of paper pulp.

One kappa point therefore represents: $10^{-3} \times (0.02 \times 5) \times e^-$, i.e. 0.1 electronic milliequivalent/g of pulp.

The method for measuring the degree of polymerization consists in measuring the specific viscosity of a pulp solution in cupriethylene diamine and in deducing the mean degree of polymerization (DP) therefrom, according to French Standard NF T 12 005 (March 1953).

The pulps are washed beforehand with water (90° C., 20 min) and dried in an oven (50° C., under vacuum) and then form the subject of a first determination of the kappa number and of the DP. The two pulps used then have the following characteristics collated in Table 3.

TABLE 3

| Nature of the initial pulp | Initial K | Initial DP |
| --- | --- | --- |
| Unbleached hardwood pulp (A) | 19 | 1190 |
| Unbleached softwood pulp (B) | 29 | 1350 |

EXAMPLE 1

Preparation of the ligands (VIII B) of the Bispicen type

N,N'-Dimethylethylenediamine is commercially available. The other diamines are obtained according to the publication Helvetica Chim. Acta, 57, 1974, p. 1036.

The substituted chloromethylpyridines are prepared from the corresponding N-oxide compounds according to the following references:

18. E. C. Taylor Jr. and A. J. Crouetti, (1956), 36, p. 53
19. H. J. Hertog and W. P. Combe, Rec. Trav. Chim., (1951), 70, 581.
20. J. H. Barnes, F. R. Hartley and C. E. L. Jones, Tet., (1982), 38, (22), 3277.

The die/nine (10 mmol) is dissolved in water (5 ml) and then picolyl chloride (20 mmol), which may or may not be substituted, is added. 5N sodium hydroxide solution is then added so as to maintain the pH from 9 to 9.5. If the reaction medium contains too much insoluble compounds, ethanol (5 ml) is added.

When the pH of the medium no longer changes, basification is carried out to a pH greater than 12 and extraction is carried out either with ether or with dichloromethane. The organic phase is either distilled or chromatographed on basic alumina, the eluent being dichloromethane.

The diamines can be converted to their hydrochlorides by bubbling HCl gas into their ether solutions.

Diamine (VIII B-1) with $R_2=R'_2=CH_3$ and $R_3=H$. Yellow oil, B.p.=120°–130° C./0.05 mm Hg. $^1H$ NMR, 90 MHz, $CDCl_3$, in ppm: 2.10 (s, 6H), 2.4 (s, 4H), 4.3 (s, 4H), 7.2–8.3 (m, 8H).

Diamine (VIII B-2) with $R_2=R'_2=CH_3$ and $R_3$=4-Cl Hydrochloride (HCl), melting point=162°–164° C. $^1H$ NMR, 90 MHz, $d_6$-DMSO, in ppm: 2.45 (s, 6H), 3.8 (s, 4H), 4.6 (s, 4H), 7.2–8.3 (m, 10H).

Diamine (VIII B-3) with $R_2=R'_2=CH_3$ and $R_3$=4-OEt Hydrochloride (HCl), melting point=168°–170° C. $^1H$ NMR, 90 MHz, $CDCl_3$, in ppm: 1.09 (t, 6H), 2.03 (s, 6H), 2.4 (s, 4H), 4.35 (s, 4H), 4.52 (q, 4H), 6.6–8.2 (m, [lacuna]).

EXAMPLE 2

1) Delignification and bleaching stage 400 ml of distilled water, then 207 mg (350 µmol) of the ligand TPA (tris (pyrid-2-ylmethyl)amine) and 59 mg (349 µmol) of $MnSO_4 \cdot H_2O$ and finally 5 g of wood pulp (i.e. in a theoretical ratio of 70 µmol of future redox catalyst $[(TPA)Mn(III)O_2Mn(IV)(TPA)]^{3+}$ per 1 g of pulp) are placed in a glass receptacle with a double jacket for keeping the temperature at the chosen value.

Hydrogen peroxide in solution in water is then added in a single step at the beginning of the reaction or else progressively over time, with stirring of the heterogeneous medium, The tests are carried out at different temperatures (60° C., 80° C., 90° C. and 98° C.) for a predetermined time.

2) Stopping the reaction and washing

The preceding oxidation reaction is stopped by washing the pulp with 0.1M pyrophosphate buffer with a pH of 6.0.

3) Alkaline extraction

After the preceding washing, the pulp is placed for 1 hour in a 0.25M sodium hydroxide solution at 60° C.

The aim of this operation is to extract, from the pulp, the fragmented compounds, phenols and carboxylates, which are soluble in the hot alkaline solution. The pulp thus treated is copiously washed with water in order to remove all traces of base, filtered off and dried in an oven (50° C.) under vacuum. A new determination of the kappa number and also optionally of the DP is then carried out.

Table 4 collates the $H_2O_2$ contents and the kappa numbers obtained with or without manganese, at a temperature of 90° C., for a duration of oxidation of 3 hours and at a pH of 3.5.

TABLE 4

| | K obtained without Mn | K obtained with 70 micromol of $Mn^{2+}$/g of pulp |
| --- | --- | --- |
| Pulp (A) Initial K = 19 $H_2O_2$ = 1.85 mmol/g of pulp | 12.5 | 3.3 |
| Pulp (B) Initial K = 29 $H_2O_2$ = 2.8 mmol/g of pulp | 20.5 | 3.4 |

As it is known than 1 mmol of $H_2O_2$ contributes 2 electronic milliequivalents, a theoretical amount of 1.9 milliequivalents/g of pulp, i.e. 1.9 mmol of $H_2O_2$/g of pulp, will be necessary for a pulp with a kappa number of 19 and 2.9 mmol of $H_2O_2$/g of pulp will be necessary for a kappa number of 29. It is noted that in the above tests the kappa number changes from 19 to 3.3 for the pulp A and from 29 to 3.4 for the pulp B.

EXAMPLE 3

In this example, the influence of the pH of the reaction medium during the oxidation was studied. The two pulps A and B were treated analogously to Example 1, it being specified that the duration of Stage 1) is 3 h and the temperature is 90° C. The pH of the aqueous medium of Stage 1) is varied by virtue of the use of a buffered medium based on succinic acid and sodium hydroxide.

The results obtained appear in Table 5 below:

TABLE 5

| Treatment of the pulps | Pulp (A) K |
|---|---|
| Without treatment | 19 |
| With treatment |  |
| pH = 3.5; without Mn | 12.5 |
| pH = 2; with Mn | 7 |
| 2.5; with Mn | 5 |
| 3.0; with Mn | 4.3 |
| 3.7; with Mn | 2.3 |
| 5.0; with Mn | 5.9 |
| 6.0; with Mn | 9.3 |
| 7.0; with Mn | 10.3 |

A maximum effect can be observed for the pulp A at a pH of 3.6.

EXAMPLE 4

The effects of the temperature of the reaction medium of the delignification and bleaching stage (Stage 1), which is analogous to that of Example 2, were studied, the pH having the value 3.5 and the initial $H_2O_2$ content being 1.85 mmol/g of pulp A for a duration of oxidation of 5 h.

The results are collated in Table 6:

TABLE 6

| Oxidation temperature, °C. | K without Mn | K with 70 µM $Mn^{2+}$/g of pulp |
|---|---|---|
| 60 | 13.0 | 6.4 |
| 80 | 12.1 | 4.7 |
| 90 | 12.5 | 2.5 |
| 98 | 10.4 | 2.6 |

EXAMPLE 5

The effects of the duration of Stage 1) were studied, the conditions being, as regards the other parameters, identical to those of Example 3, the temperature being 90° C. The results appear in Table 7:

TABLE 7

| Duration in hours | K, without Mn | K with 70 µM/g of pulp |
|---|---|---|
| 0 | 18.5 | 18.5 |
| 1 | 14.7 | 5.4 |
| 2 | 14.2 | 4.5 |
| 3 | n.d. | 3.3 |
| 4 | n.d. | 2.9 |
| 5 | n.d. | 2.9 |
| 16 | n.d. | 2.5 |

EXAMPLE 6

The effect of the redox catalyst content in µmol per g of pulp A was studied by taking the conditions of Example 4 for a duration of 3 h and at a temperature of 90° C.

The results appear in Table 8 below:

TABLE 8

| Redox catalyst $(TPAMnO)_2^{3+}$ content in micromol/g 2 of pulp | K |
|---|---|
| 70 | 3.0 |
| 35 | 3.3 |
| 17.5 | 5.0 |
| 8.8 | 5.5 |
| 4.4 | 7.1 |

EXAMPLE 7

The influence of the amount of pulp A was studied for the same amount of redox catalyst $(TPAMnO)_2^{3+}$ of 70 µmol/g of pulp, of $H_2O_2$ 1.85 mmol/g, at a pH of 3.5 and at a temperature of 90° C., for a duration of the oxidation stage of 3 h, in 400 ml of water.

The results appear in Table 9:

TABLE 9

| Amount of pulp A in g | K |
|---|---|
| 5 | 3.3 |
| 10 | 3.5 |
| 20 | 3.8 |

EXAMPLE 8

The influence of phosphate ions introduced by sodium hydrogenphosphate was studied with or without the $(TPAMnO)_2^{3+}$ complex with a buffered aqueous solution containing 1.85 mmol of $H_2O_2$/g of pulp A and maintained at 60° C. at a pH of 3.5 for a duration of oxidation of 5 hours.

The results appear in Table 10:

TABLE 10

| Phosphate | K, with Mn | K without Mn |
|---|---|---|
| 0.1M | 4.8 | 14.8 |
| without | 5.5 | 12.5 |

It is noted that the presence of phosphate makes it possible to decrease the kappa number.

EXAMPLE 9

The influence of recycling the catalyst was studied.
The procedure is the following:
Duration of reaction: 4 hours/cycle
Temperature: 90° C.
$H_2O_2$ 1.8 mmol/g of pulp
Pulp: unbleached (kappa number=18.5), 5 g per cycle
Complex: Mn(II)/TPA 75 µmol/g of pulp (determined for the 1st treatment).

After a first treatment, the reaction medium is separated from the paper pulp by filtration. The kappa number is determined on the treated pulp. The reaction medium is brought into contact with a new batch of pulp. A new hydrogen peroxide solution is introduced continuously. It is estimated that from 40 to 50% of the catalyst is recovered after each cycle.

The results obtained appear in Table 11:

TABLE 11

| Cycle number | Kappa number |
| --- | --- |
| 1 | 3.1 |
| 2 | 4.3 |
| 3 | 5.9 |
| 4 | 7.5 |

EXAMPLE 10

The influence of the experimental conditions of the oxidation stage (Stage 1) was studied on the pulp A and emerges from the results which appear in Table 12 below:

TABLE 12

| 70 μmol of complex and 1.85 mmol of H$_2$O$_2$/g of pulp | DP | Kappa number |
| --- | --- | --- |
| Influence of the duration in hours | | |
| 1 | 730 | 5.4 |
| 2 | 720 | 4.5 |
| 3 | 710 | 3.3 |
| 4 | 710 | 3.0 |
| 5 | 710 | 2.9 |
| 16 | 600 | 2.5 |
| Influence of the amount of pulp in g | | |
| 5 | 710 | 3.3 |
| 10 | 700 | 3.5 |
| 20 | 710 | 3.8 |
| Role of the complexing agents: | 800 | |
| TPA/Mn(II) molar ratio = 1.5: | 860 | |
| +0.5 equivalent of EDTA: | | |
| Influence of the temp. in °C. | | |
| 60 | 750 | 6.4 |
| 80 | 760 | 4.7 |
| 90 | 710 | 3.0 |
| 98 | 720 | 2.6 |

EXAMPLE 11

An unbleached hardwood pulp which has a kappa number equal to 13 is subjected to the same stages as Example 1 but with ligands of the Bispicen type.

Table 13 below shows the role of the substituents on the kappa number obtained.

TABLE 13

| Ligands | Kappa number |
| --- | --- |
| Bispicen | 7 |
| VIII B-1 | 3.5 |
| VIII B-2 | 5.4 |
| VIII B-3 | 3.0 |

Substitution of the two hydrogens of the two aliphatic nitrogen atoms of Bispicen by methyl groups (VIII B-1) improves the delignification.

In contrast, substitution of each pyridyl ring by a chlorine in the 4-position (VIII B-2) increases the kappa number with respect to (VIII B-1) and thus is not favourable.

An ethoxy radical (-OEt) in the 4-position leads to a slightly better result than (VIII B-1).

We claim:

1. Process for the delignification and bleaching of a lignocellulose material in which an aqueous solution of a redox catalyst and of an oxidizing agent is reacted with the said material, wherein the said catalyst contains an organometallic cation of general formula (VII)

[(L)MnO$_2$Mn(L)]$^{n+}$  (VII)

in which:

Mn represents manganese in a III or IV oxidation state, it being possible for the two Mn atoms of this cation to form the pair in the III-III or III-IV or IV-IV oxidation state, n has the value 2, 3 or 4, O representing oxygen, L represents a ligand of general formula (VIII):

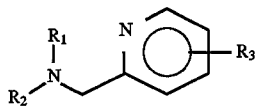

(VIII)

in which
either R$_1$ represents the radical:

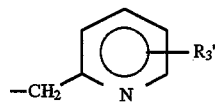

R$_2$ then representing the radical:

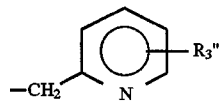

R$_3$, R'$_3$ and R"$_3$ each representing, independently of one another, a group chosen from hydrogen, C$_1$ to C$_4$ lower alkyl, C$_1$ to C$_4$ lower alkoxy or halogen, or R$_1$ represents the radical:

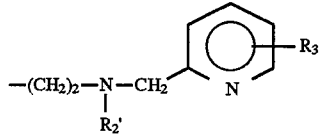

R$_2$ and R'$_2$ then being identical and representing a group chosen from hydrogen or C$_1$ to C$_4$ lower alkyl, R$_3$ representing a group chosen from hydrogen, C$_1$ to C$_4$ lower alkyl, C$_1$ to C$_4$ lower alkoxy or halogen.

2. Process according to claim 1, wherein the pH of the said aqueous solution is less than 7.

3. Process according to claim 2, wherein the said pH is between 2 and 5.

4. Process according to claim 1, wherein, after the oxidation reaction, the lignocellulose material obtained is treated with a basic aqueous solution.

5. Process according to claim 1, wherein the said oxidizing agent is added little by little to the solution of the redox catalyst so that there is not an excess of the said oxidizing agent which can react directly with the said lignocellulose material.

6. Process according to claim 1, wherein the said oxidizing agent is chosen from ozone, hydrogen peroxide, an alkyl hydroperoxide, hypochlorous acid, chlorine, chlorine dioxide or one of their mixtures.

7. Process according to claim 6, wherein the said oxidizing agent is hydrogen peroxide.

8. Process according to one of claims 1 to 7, wherein the said lignocellulose material is wood fragments.

9. Process according to claim 1, wherein the said lignocellulose material is paper pulp containing lignin.

10. Process according to claim 1, wherein the ratio by weight of the said catalyst to the lignocellulose material is between 0.1 and 10%.

11. Process according to one of claim 1, wherein the temperature of the said aqueous solution is between 80° and 100° C.

12. Process according to claim 1, wherein the catalyst/oxidizing agent molar ratio is between 0.1% and 4%.

13. Process according to claim 1, wherein the ratio by weight of the said lignocellulose material to the oxidizing agent is between 2 and 100.

* * * * *